US012117817B2

(12) United States Patent
Isozumi et al.

(10) Patent No.: US 12,117,817 B2
(45) Date of Patent: Oct. 15, 2024

(54) MULTI-FUNCTION INTEGRATED WORK TABLE AND PRODUCTION SYSTEM USING THE SAME

(71) Applicant: KAWADA ROBOTICS CORPORATION, Tokyo (JP)

(72) Inventors: Takakatsu Isozumi, Tokyo (JP); Naoto Shiroma, Tokyo (JP); Makoto Mizukawa, Tokyo (JP); Isao Aramaki, Tokyo (JP); Tadahiro Fujiwara, Tokyo (JP); Hironori Mizoguchi, Tokyo (JP); Nobuyuki Murai, Tokyo (JP); Shoichi Hayakawa, Tokyo (JP)

(73) Assignee: KAWADA ROBOTICS CORPORATION, Tokyo (JP)

( * ) Notice: Subject to any disclaimer, the term of this patent is extended or adjusted under 35 U.S.C. 154(b) by 986 days.

(21) Appl. No.: 17/045,466

(22) PCT Filed: Apr. 5, 2019

(86) PCT No.: PCT/JP2019/015221
§ 371 (c)(1),
(2) Date: Oct. 5, 2020

(87) PCT Pub. No.: WO2019/194316
PCT Pub. Date: Oct. 10, 2019

(65) Prior Publication Data
US 2021/0026335 A1     Jan. 28, 2021

(30) Foreign Application Priority Data
Apr. 5, 2018    (JP) ................................. 2018-073221

(51) Int. Cl.
*G05B 19/418*     (2006.01)
*B25J 5/00*     (2006.01)
*B25J 9/16*     (2006.01)

(52) U.S. Cl.
CPC .......... *G05B 19/4189* (2013.01); *B25J 5/007* (2013.01); *B25J 9/1687* (2013.01); *G05B 19/41865* (2013.01)

(58) Field of Classification Search
CPC .......... G05B 19/4189; G05B 19/41865; G05B 19/4182; G05B 19/418; B25J 5/007;
(Continued)

(56) References Cited

U.S. PATENT DOCUMENTS 5,586,387 A    12/1996   Nakatani et al.
6,347,253 B1    2/2002   Fujita et al.
(Continued)

FOREIGN PATENT DOCUMENTS

CN    106426228 A    2/2017
EP    364138 A2    4/1990
(Continued)

OTHER PUBLICATIONS

English translation of JP-2014144490-A, 2014, Kasagawa (Year: 2014).*
(Continued)

*Primary Examiner* — Kenneth M Lo
*Assistant Examiner* — Jonathan Michael Skrzycki
(74) *Attorney, Agent, or Firm* — Procopio, Cory, Hargreaves & Savitch LLP (57) ABSTRACT

A robot and work equipment are disposed near a work table including a work table-side controller and a process planning and designing controller capable of being operated by a user. The work table-side controller executes a work process in which the robot and the work equipment operate in conjunction, by receiving signals carrying identification and state monitoring information from a robot-side controller and the work equipment and then sending these signals to the process planning and designing controller, and by
(Continued)

sending operation command signals to the robot-side controller and the work equipment in accordance with the aforementioned work process and then receiving operation status signals from the robot-side controller and the work equipment. Based on the signals carrying the identification and state monitoring information on the robot and the work equipment, the process planning and designing controller plans and designs the aforementioned work process.

19 Claims, 5 Drawing Sheets

(58) Field of Classification Search
CPC .. B25J 9/1687; B25J 5/00; B25J 13/00; Y02P 90/02
See application file for complete search history.

(56) References Cited

U.S. PATENT DOCUMENTS

| | | | | |
|---|---|---|---|---|
| 6,415,204 | B1* | 7/2002 | Hirabayashi | B23P 21/004 |
| | | | | 29/430 |
| 2007/0299427 | A1 | 12/2007 | Yeung et al. | |
| 2009/0118865 | A1* | 5/2009 | Egawa | B25J 19/023 |
| | | | | 901/47 |
| 2010/0211220 | A1 | 8/2010 | Nishi et al. | |
| 2011/0047788 | A1 | 3/2011 | Immekus et al. | |
| 2012/0298706 | A1* | 11/2012 | Gordon | B25J 15/0491 |
| | | | | 224/401 |
| 2015/0032244 | A1 | 1/2015 | Hashiguchi et al. | |
| 2015/0053787 | A1 | 2/2015 | Tomuta et al. | |
| 2015/0253757 | A1 | 9/2015 | Ikeda | |
| 2017/0341221 | A1* | 11/2017 | Hashimoto | B25J 5/02 |
| 2018/0178379 | A1* | 6/2018 | Takeda | B25J 9/1671 |
| 2018/0272535 | A1* | 9/2018 | Ogawa | B25J 13/085 |
| 2019/0179290 | A1* | 6/2019 | Yoshida | G06Q 10/0633 |
| 2021/0379756 | A1* | 12/2021 | Guerin | G05B 19/409 |

FOREIGN PATENT DOCUMENTS

| | | | | |
|---|---|---|---|---|
| EP | 2466404 | A1 * | 6/2012 | ....... G05B 19/41865 |
| JP | H02199510 | A | 8/1990 | |
| JP | H105038664 | A | 2/1993 | |
| JP | H05158528 | A | 6/1993 | |
| JP | H11039018 | A | 2/1999 | |
| JP | H11338509 | A | 12/1999 | |
| JP | 2009539509 | A | 11/2009 | |
| JP | 2010064198 | A | 3/2010 | |
| JP | 2010191602 | A | 9/2010 | |
| JP | 2012035391 | A | 2/2012 | |
| JP | 2012218093 | A | 11/2012 | |
| JP | 2014144490 | A * | 8/2014 | |
| JP | 2015024477 | A | 2/2015 | |
| JP | 2015061722 | A | 4/2015 | |
| JP | 2015168038 | A | 9/2015 | |
| JP | 2015211997 | A | 11/2015 | |
| WO | WO-9717173 | A1 * | 5/1997 | ........... G05B 19/402 |

OTHER PUBLICATIONS

Extended European Search Report for related EP App No. 19780655.7 dated May 14, 2021, 11 pgs.
Office Action for related JP App No. 2018-073221 dated May 15, 2019, 19 pgs.
International Search Report and Written Opinion for related PCT App No. PCT/JP2019/015221 dated May 14, 2019, 16 pgs. (partial translation).

* cited by examiner

MULTI-FUNCTION INTEGRATED WORK TABLE AND PRODUCTION SYSTEM USING THE SAME

CROSS-REFERENCE TO RELATED APPLICATIONS

This application is a U.S. National Stage entry of PCT Application No: PCT/JP2019/015221 filed Apr. 5, 2019, which claims priority to Japanese Patent Application No. 2018-073221 filed Apr. 5, 2018, the contents of which are incorporated herein by reference.

TECHNICAL FIELD

The present invention relates to a multi-function integrated work table on which tasks are performed by a robot and peripheral equipment operating in conjunction with each other, and to a production system using this multi-function integrated work table.

BACKGROUND ART

Robots including articulated arms have been gaining widespread use at manufacturing sites, and the replacement of human labor by robots is in progress for tasks that used to depend on human labor. On the other hand, introducing a robot involves not only bearing an introduction cost of the robot itself, but also preparing peripheral devices, including expensive jigs, according to the contents of tasks to construct a new production system that uses the robot, as well as learning how to operate a robot-specific teaching system. Unable to meet these conditions, many users such as companies that do not have a production technology division, small and medium-sized companies, and the like stop short of introducing a robot.

Most of conventional production systems using a robot are configured, such that a robot controller controls a robot body and an automated guided vehicle (AGV) on which the robot body is mounted, as well as work equipment around a work table (on the work table or near the work table). The problem is that connecting a large number of pieces of work equipment leads to a swell in the number of communication and connection means (communication interfaces and communication applications) of the robot controller, because the robot controller should control not only the robot, but also the AGV and work equipment. Therefore, it is desired to establish a more efficient approach to developing and introducing a production system using a robot that solves these problems.

There are existing approaches to introducing, as a production system using a robot, a robot controller capable of monitoring a machine tool that operates in conjunction with a robot, and a workbench capable of supplying electricity and air, connecting to a network, etc., but all these approaches fail to solve the above problems.

Specifically, as one example of conventional approaches to developing and introducing a production system using a robot, Patent Literature 1 proposes a system in which a moving robot and a workbench are fixedly connected to each other and electricity and air are supplied from the workbench to the moving robot, and which is connected to a network through the workbench to transmit control information and operation information on the moving robot to the network.

As another example, Patent Literature 2 proposes a system in which a robot feeds and discharges work to and from a machine tool, and in this system, operation of the robot diverges according to the operation state of the machine tool.

CITATION LIST

Patent Literature

Patent Literature 1: JP-A-2014-144490
Patent Literature 2: JP-A-2015-168038

SUMMARY OF INVENTION

Technical Problem

The former system can provide scalability by connecting the robot and the work bench to each other. However, the workbench is merely disposed with a connector; actual information processing is undertaken by the robot controller, and no external equipment is disposed or controlled.

While the robot and the external equipment can operate in conjunction with each other also in the latter system, the state of the external equipment is monitored by the robot controller and thus this system lacks in scalability for connecting various pieces of external equipment.

Therefore, an object of the present invention is to make it possible to easily construct a production system using a robot so that a production system using a robot can be developed and introduced more efficiently. To this end, the invention introduces a multi-function integrated work table by which a robot and work equipment are combined to construct a production system. This multi-function integrated work table allows the robot and the work equipment to operate in conjunction with each other, and simplifies the procedure of construction and reconstruction of a production system associated with arrangement, addition, replacement, change in arrangement, etc. of work equipment.

Solution to Problem

A multi-function integrated work table that advantageously solves the above-described problems is a work table which configures a production system by combining at least one robot that is disposed near the work table and has a robot-side controller and at least one piece of work equipment that is disposed on the work table and/or near the work table and used in a work process performed with the robot, the work table being characterized in that:

a work table-side controller and a process planning and designing controller that is capable of being operated by a user are provided in a state of being communicably connected to each other;

the work table-side controller has a work equipment communication and connection means that is compatible with one or more communication standards and capable of communicating with the work equipment, and a robot communication and connection means that is capable of communicating with the robot-side controller, and the work table-side controller executes the work process in which the robot and the work equipment operate in conjunction with each other, by receiving signals carrying identification and state monitoring information on the robot and the work equipment from the robot-side controller and the work equipment and then sending these identification and state monitoring signals to the process planning and designing controller, and by further sending operation command signals to the robot-side controller and the work equipment in accordance with the work process in which the robot and the work equipment operate in conjunction with each other and then receiving operation status signals from the robot-side controller and the work equipment; and based on the signals carrying the identification and state monitoring information on the robot and the work equipment, the process planning and designing controller plans and designs the work process in which the robot and the work equipment operate in conjunction with each other.

A production system according to the present invention that advantageously solves the above-described problems by using the multi-function integrated work table includes:

the work table including the work table-side controller and the process planning and designing controller;

the at least one robot that is disposed near the work table and has a robot-side controller; and the at least one piece of work equipment that is disposed on the work table and/or near the work table, is connected to the work table-side controller based on at least one communication standard, and is used in a work process using the robot, the production system being characterized in that:

the work table-side controller executes a work process in which the robot and the work equipment used in the work process operate in conjunction with each other;

based on signals carrying identification and state monitoring information on the robot and the work equipment, the process planning and designing controller plans and designs a work process in which the robot and the work equipment operate in conjunction with each other; and the work table-side controller executes the work process in which the robot and the work equipment operate in conjunction with each other, by sending operation command signals to the robot and the work equipment in accordance with the work process and then receiving operation status signals from the robot and the work equipment.

Advantageous Effects of Invention

In the above-described multi-function integrated work table according to the present invention, when at least one robot is disposed near the work table and at least one piece of work equipment used in a work process using the robot is disposed on the work table and/or near the work table, the work table-side controller of the work table executes a work process in which the robot and the work equipment operate in conjunction with each other, by communicating with the work equipment by the work equipment communication and connection means of the work table that is compatible with one or more communication standards and capable of communicating with the work equipment, while communicating with the robot-side controller by the robot communication and connection means of the work table, and by receiving signals carrying identification and state monitoring information from the robot and the work equipment and then sending these identification and state monitoring signals to the process planning and designing controller, and by sending operation command signals to the robot and the work equipment in accordance with the work process and then receiving operation status signals from the robot and the work equipment, and based on the signals carrying the identification and state monitoring information on the robot and the work equipment, the process planning and designing controller that can be operated by a user plans and designs a work process in which the robot and the work equipment operate in conjunction with each other.

Thus, the multi-function integrated work table according to the present invention can execute a work process in which a robot near the work table and work equipment on the work table and/or near the work table operate in conjunction with each other, as well as allows a user to easily plan and design this work process, and can thereby simplify the procedure of construction and reconstruction of a production system associated with arrangement, addition, replacement, change in arrangement, etc. of work equipment. It is therefore possible to easily construct a production system using a robot and thereby more efficiently develop and introduce a production system using a robot.

In the above-described production system according to the present invention that uses the multi-function integrated work table of the invention, the process planning and designing controller that can be operated by a user receives, through the work table-side controller, signals carrying identification and state monitoring information on an at least one robot that is disposed near the work table and at least one piece of work equipment that is disposed on the work table and/or near the work table, has at least one communication standard, and is used in a work process using the robot, from these robot and work equipment, and based on these signals carrying the identification and state monitoring information, plans and designs a work process in which the robot and the work equipment operate in conjunction with each other, and the work table-side controller executes the work process in which the robot and the work equipment operate in conjunction with each other, by sending operation command signals to the robot and the work equipment in accordance with the work process and then receiving operation status signals from the robot and the work equipment.

Thus, the production system according to the present invention can execute a work process in which a robot near the work table and work equipment on the work table and/or near the work table operate in conjunction with each other, as well as allows a user to easily plan and design the work process, and can thereby simplify the procedure of construction and reconstruction of a production system associated with arrangement, addition, replacement, change in arrangement, etc. of work equipment. It is therefore possible to easily construct a production system using a robot and thereby more efficiently develop and introduce a production system using a robot.

In the multi-function integrated work table according to the present invention, it is preferable that:

the pieces of work equipment be classified by equipment type;

the work table-side controller have a work equipment communication and connection program corresponding to at least one equipment type; and when the pieces of work equipment connected to the work table-side controller are of the same equipment type, the work equipment communication and connection program be able to communicate with these pieces of work equipment by the same work equipment communication and connection program, contain information on tasks that the pieces of work equipment connected to the work table-side controller are capable of executing, and provide the process planning and designing controller with information on the executable tasks and information that aids creation of a program for executing these tasks in addition to identification information on the pieces of work equipment connected to the work table-side controller.

In the multi-function integrated work table according to the present invention, it is preferable that:
  a jig placement region in which a jig used in a work process using the robot is placed and/or a tool hanger that holds a hand tool used in a work process using the robot be disposed on the work table;
  the jig and/or the hand tool be provided with a data tag containing identification information on the jig and/or the hand tool;
  the work table further have, in the jig placement region and/or on the tool hanger, jig and/or hand tool identification means for identifying the jig and/or the hand tool on the work table by recognizing the data tag of the jig and/or the hand tool; and
  the work table-side controller be connected to the jig and/or hand tool identification means to acquire identification information on the jig and/or the hand tool from the jig and/or hand tool identification means.

In the multi-function integrated work table according to the present invention, it is preferable that at least one of the data tags of the jig and/or the hand tool be a two-dimensional bar code and/or an IC chip.

In the multi-function integrated work table according to the present invention, it is preferable that:
  the work table-side controller have a jig and/or hand tool recognition program; and
  the jig and/or hand tool recognition program contain information on tasks that the robot is capable of executing using a jig and/or a hand tool disposed on the work table, and provide the process planning and designing controller with information on the executable tasks and information on a sample operation for executing these tasks in addition to identification information on the jig and/or the hand tool disposed on the work table.

In the production system according to the present invention, it is preferable that:
  the robot have a plurality of articulated arms, a head, a neck that is capable of changing the posture of the head, a self-propelled cart that is capable of moving the robot to an arbitrary position and in an arbitrary direction, and a robot-side controller that controls operation of the articulated arm, the head, the neck, and the self-propelled cart;
  the articulated arm have a tool changer to which different hand tools are attachable, and a mechanism that supplies electricity and/or air required for operation of the hand tool;
  the head have a stereo camera, and an imaging direction of the stereo camera be changeable through operation of the neck;
  the work table have a power source and/or an air supply source; and
  the self-propelled cart have a connecting part that is separably connected to the work table, and when the connecting part is connected to the work table, electricity and/or air supplied from the power source and/or the air supply source of the work table through the connecting part be supplied to the robot, and also a battery mounted on the self-propelled cart be charged with electricity supplied from the electricity supply source of the work table through the connecting part.

In the production system according to the present invention, it is preferable that:
  the work table have a position recognition marker thereon for the robot to recognize a relative positional relationship between the work table and the robot; and
  when the connecting part of the self-propelled cart is connected to the work table, the robot take an image of the position recognition marker by the stereo camera and share a common coordinate system with the work table.

In the production system according to the present invention, it is preferable that the process planning and designing controller be included in the work table, and compile, as robot operation information, a robot operation pattern for the robot to use the work equipment and/or a control pattern of a hand tool attached to the robot, and/or compile an operation pattern of the work equipment as work equipment operation information, and construct a production system by combining the compiled pieces of robot and work equipment operation information.

In the production system according to the present invention, it is preferable that the compiled pieces of robot and work equipment operation information be input into and retained by the work table-side controller, and that operation of the robot and operation of the work equipment be controlled by the work table-side controller.

In the production system according to the present invention, it is preferable that:
  the process planning and designing controller be included in the robot instead of the work table;
  the compiled robot operation information be input into and retained by the robot-side controller;
  the compiled work equipment operation information be input into and retained by the work table-side controller;
  operation of the robot be controlled by the robot-side controller; and
  operation of the work equipment be controlled by the work table-side controller.

In the production system according to the present invention, it is preferable that:
  the production system include a production management system that has a process management controller and manages an overall process including a work progress status of at least a process preceding and/or a process succeeding a current work process; and
  the work table-side controller communicate with the process management controller.

DESCRIPTION OF EMBODIMENTS

Figure 1:
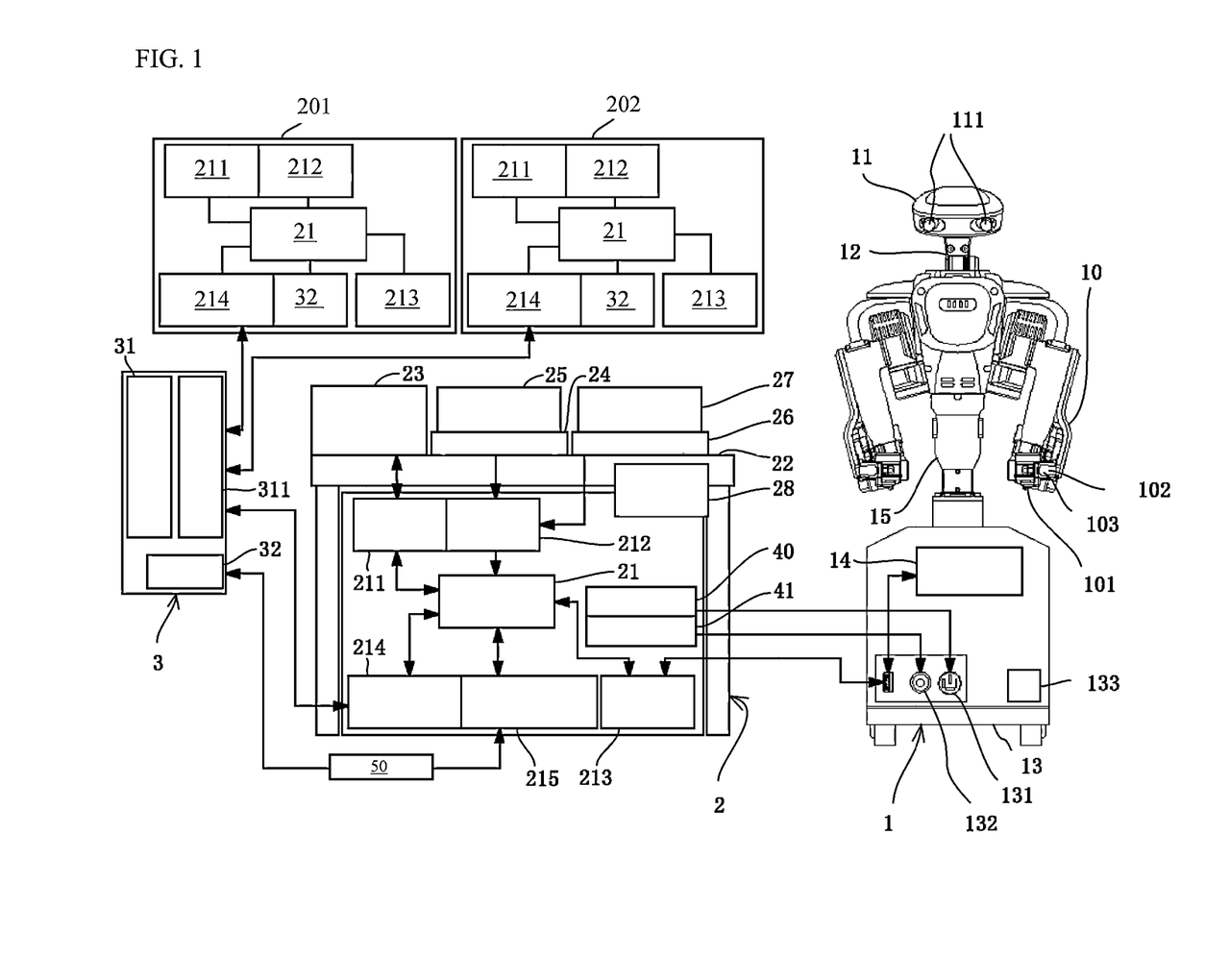
FIG. 1 is a configuration diagram of one embodiment of a production system according to the present invention using one embodiment of a multi-function integrated work table according to the invention.

Embodiments of the present invention will be described in detail below based on the drawings using examples of implementation. Here, FIG. 1 is a configuration diagram of one embodiment of a production system according to the present invention using one embodiment of a multi-function integrated work table according to the invention.

The production system of the one embodiment of the present invention includes a multi-skilled humanoid robot (hereinafter referred to simply as a robot) 1, a robot task integration table (hereinafter referred to as an RIT) 2 as the multi-function integrated work table of the one embodiment of the invention, and a production management system 3 that manages work processes of an entire factory.

The robot 1 has a robot body 15 having a plurality of articulated arms 10, a head 11, and a neck 12 capable of changing the direction of the head, a self-propelled cart 13, and a robot-side controller 14 that controls operation of the robot body 15 and the self-propelled cart 13.

Each articulated arm 10 has a tool changer 101 to which different hand tools can be attached, an electricity supply mechanism 102 that supplies electricity required for operation of a hand tool, and an air supply mechanism 103 that supplies air required for operation.

The head 11 has a stereo camera 111, and an imaging direction of the stereo camera 111 can be changed through operation of the neck 12. The imaging direction can be desirably changed to at least the two directions of an up-down direction around a predetermined pitch axis and a left-right direction around a predetermined yaw axis.

The self-propelled cart 13 is desirably an automated guided vehicle (AGV) of simultaneous localization and mapping (SLAM) type that can move the robot 1 to an arbitrary position and in an arbitrary direction. The self-propelled cart 13 may have a connecting part 131 for a power source and a connecting part 132 for an air supply source and supply electricity and air to the robot 1. Further, the self-propelled cart 13 may have a battery 133 and charge the battery 133 with electricity supplied from the power source connecting part 131.

The RIT 2 has: an RIT-side controller 21 as a table-side controller; a workbench 22; one or more pieces of work equipment 23 disposed on the workbench 22 or in a peripheral part near the workbench 22; a jig placement region 24 and a jig 25 on the workbench 22; a tool hanger 26 that holds a hand tool attached to the tool changer 101 of the robot 1; a hand tool 27; and a position recognition marker 28 of which the robot 1 takes an image by the stereo camera 111 to recognize a relative positional relationship between the robot 1 and the RIT 2. A power source 40 and an air supply source 41 for supplying electricity and air to the self-propelled cart 13 may be provided inside the RIT 2.

The RIT-side controller 21 has: a work equipment interface (hereinafter referred to as a work equipment I/F) 211 as a work equipment communication and connection means for communicating with one or more pieces of work equipment 23; a workbench-top tool interface (hereinafter referred to as a workbench-top tool I/F) 212 for receiving recognition information on a jig, a hand tool, etc.; a robot interface (hereinafter referred to as a robot I/F) 213 as robot communication and connection means for communicating with one or more robots 1; and a production management system interface (hereinafter referred to as a production management system I/F) 214 for communicating with the production management system 3.

The RIT-side controller 21 is configured using an ordinary computer that has, for example, a central processing unit (CPU), a memory, and an input-output circuit and performs processing, such as control, based on a given program. Each of the work equipment I/F 211, the workbench-top tool I/F 212, the robot I/F 213, and the production management system I/F 214 includes a connector for directly connecting a communication line, a radio-wave communication device for wireless connection, or an optical communication device for optical connection, and is formed by a signal conversion circuit board, a signal conversion device, or the like that is used between pieces of equipment or devices that use different communication standards to convert a signal from a communication origin in accordance with the standard that a communication destination uses and transmit the converted signal to the communication destination.

Figure 2:
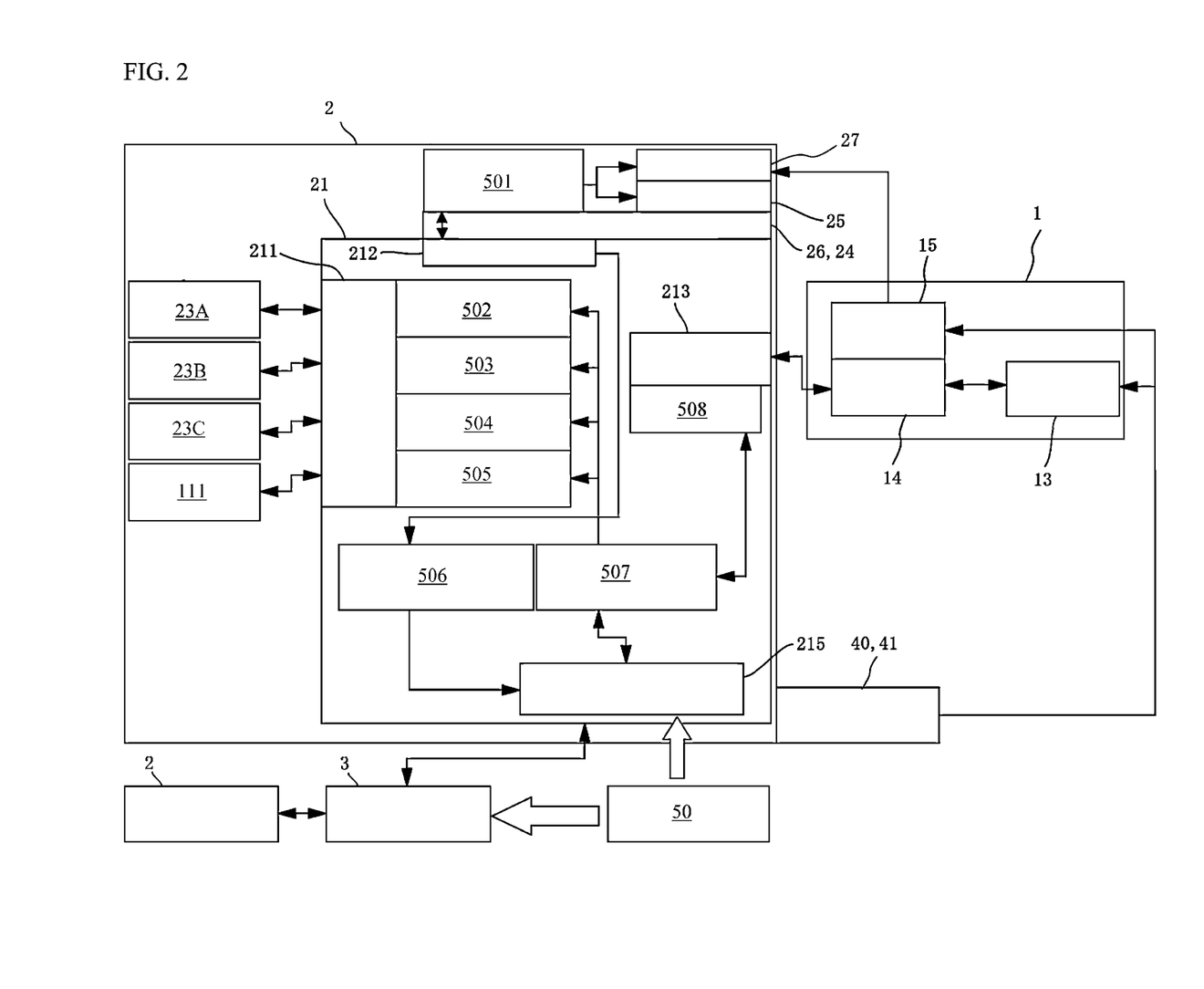
FIG. 2 is a block diagram showing, with functional blocks, the configurations of the first embodiment of the multi-function integrated work table according to the present invention and the first embodiment of the production system of the invention using this multi-function integrated work table.

As shown in FIG. 2, in the production system and the RIT 2 of the first embodiment of the present invention, the RIT-side controller 21 is installed with communication applications for performing identification, state monitoring, and operation control of pieces of work equipment connected to the work equipment I/F 211. Equipment types of the pieces of work equipment 23 connected to the work equipment I/F 211 of the RIT 2 are classified by the executable operation and the communication standard, and the communication applications are designed such that each communication application can be used for one equipment type or that the same communication application can be used for a plurality of equipment types. Further, each communication application contains information on the executable operation of the corresponding equipment type.

The jig placement region 24 and the tool hanger 26 on the workbench 22 are provided with recognition means for recognizing the jig 25 and the hand tool 27 placed therein and thereon. As the jig/hand tool recognition means, two-dimensional bar codes or IC tags containing identification information on the jig 25 and the hand tool 27 may be attached to the jig 25 and the hand tool 27, and a reading device of two-dimensional bar codes and IC tags may be provided in the jig placement region 24 and on the tool hanger 26.

The workbench-top tool I/F 212 of the RIT-side controller 21 is installed with recognition software for receiving recognition information on the jig and the hand tool input from the jig/hand tool recognition means.

The RIT 2 has a process planning and designing controller 215 that creates a plan of a work process as a human-machine interface (hereinafter referred to as an HM I/F) that can be operated by an operator as a user who constructs a production system. The process planning and designing controller 215 is configured using an ordinary computer that has, for example, a central processing unit (CPU), a memory, and an input-output circuit and performs processing, such as control, based on a given program, and is connected to the RIT-side controller 21.

Figure 3:
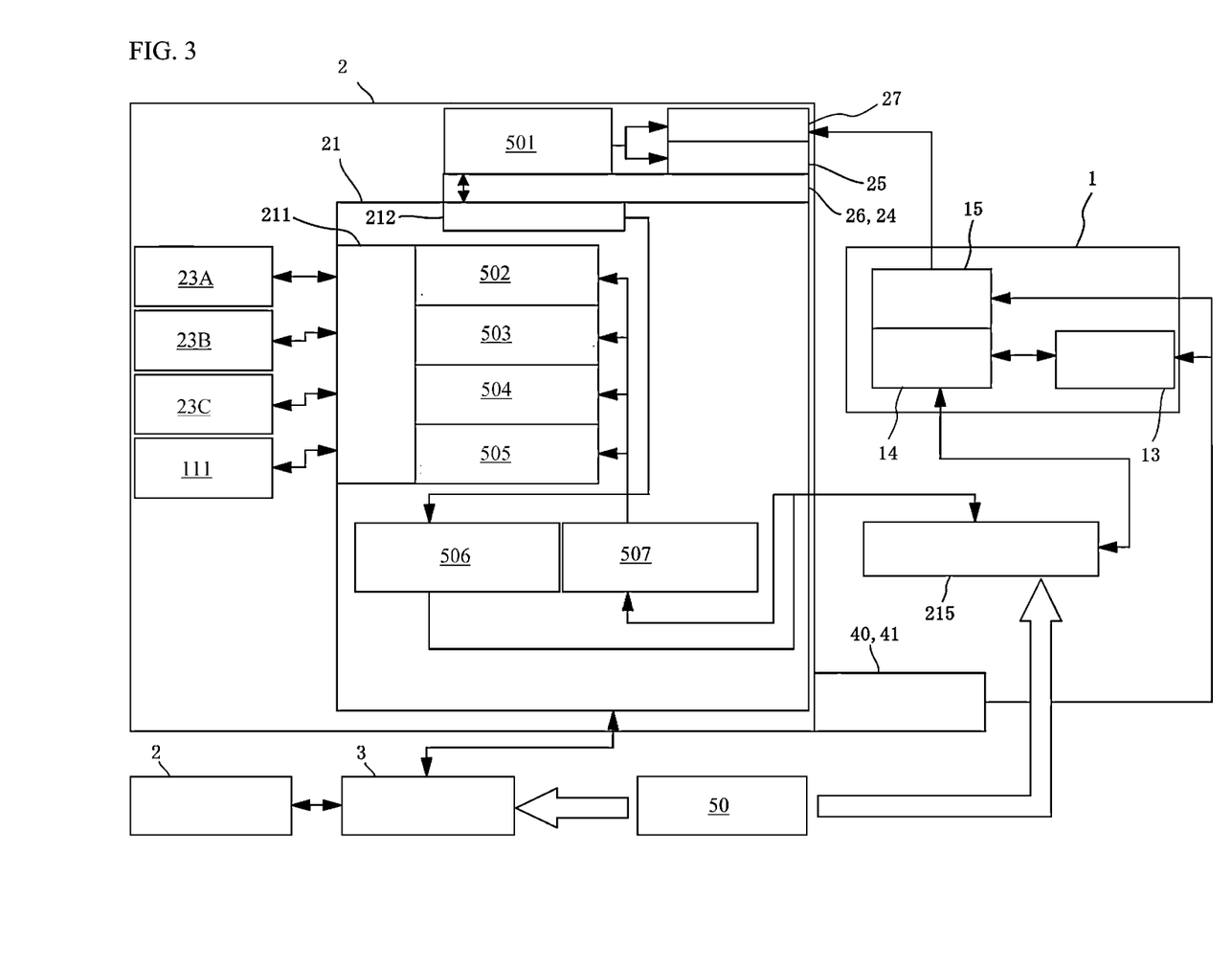
FIG. 3 is a block diagram showing, with functional blocks, the configurations of the second embodiment of the multi-function integrated work table of the present invention and the second embodiment of the production system of the invention using this multi-function integrated work table.

While the process planning and designing controller 215 is basically disposed on the side of the RIT 2, in a production system and an RIT 2 of a second embodiment of the present invention in which the robot-side controller 14 is designed to be able to directly connect to the RIT-side controller 21, the process planning and designing controller 215 may be disposed as a robot-side component as shown in FIG. 3, and in this case, the process planning and designing controller 215 is directly connected to the robot-side controller 14 without the RIT-side robot I/F 213 interposed therebetween.

The production management system 3 is configured using an ordinary computer that has, for example, a central processing unit (CPU), a memory, and an input-output circuit and performs processing, such as control, based on a given program, and has a production integration management unit 31 that manages production processes of a plurality of RITs 2 disposed inside the factory, an HM I/F 32 formed by an ordinary operation terminal that can be operated by an operator, and an RIT communication unit 311 functioning as an interface for communicating with each RIT 2. Of the RITs 2 disposed inside the factory, the RIT communication unit 311 communicates with the RIT-side controllers 21 of at least an RIT 2 that is used in a process being currently executed, an RIT 201 that is used in a process preceding the process being currently executed, and an RIT 202 that is used in a process succeeding the process being currently executed.

(Constructing Production System)

Using the RIT 2 as a platform, a user constructs a production system for performing a series of tasks by the following procedure (1) through (12):

(1) One or more pieces of work equipment 23 are disposed on the workbench 22 of the RIT 2 or in a peripheral part near the workbench 22. The work equipment I/F 211 of the RIT 2 has communication interfaces compatible with the communication standards of the pieces of work equipment 23, and the user (operator) connects each piece of work equipment 23 to an interface corresponding to the communication standard that that piece of work equipment 23 uses.

(2) When the pieces of work equipment 23 are connected to the work equipment I/F 211 of the RIT 2, the RIT-side controller 21 checks the equipment types of the pieces of work equipment 23 and runs the corresponding communication applications to start identification and state monitoring of the pieces of work equipment 23 connected.

(3) The RIT-side controller 21 sends identification and state monitoring information on the pieces of work equipment 23 to the process planning and designing controller 215, and also presents the process planning and designing controller 215 with information on tasks that the pieces of work equipment 23 can execute and application programming interfaces (hereinafter referred to as APIs) for executing these tasks.

(4) The jig 25 is disposed in the jig placement region 24 on the workbench 22 and/or the hand tool 27 for the robot 1 is disposed on the tool hanger 26 on the workbench 22.

(5) When the jig 25 and/or the hand tool 27 is disposed in the jig placement region 24 and/or on the tool hanger 26, the RIT-side controller 21 acquires identification information on the jig 25 and/or the hand tool 27 through the workbench-top tool I/F 212. As a method for identifying the jig and the hand tool, as described above, two-dimensional bar codes, IC tags, or the like containing identification information on the jig 25 and the hand tool 27 may be attached to the jig 25 and the hand tool 27, and information may be acquired by reading devices provided in the jig placement region 24 and on the tool hanger 26. The identification information may include information such as shape model data, masses, and moments of inertia of the jig 25 and the hand tool 27.

(6) The RIT-side controller 21 sends the identification information on the jig 25 and/or the hand tool 27 to the process planning and designing controller 215, and also sends to the process planning and designing controller 215 sample information on tasks that can be executed by using the jig 25 and/or the hand tool 27 and a task sample program.

(7) Using the process planning and designing controller 215, the user teaches a series of work processes in which the robot 1, with the hand tool 27 attached thereto, performs tasks using the work equipment 23 and/or the jig 25, or work processes in which the robot 1 performs tasks alone without using the work equipment 23 or the jig 25, and saves these work processes as a package. Information to be saved includes an operation pattern of the robot 1 in a series of work processes and timing of sending and receiving control signals to and from the work equipment 23 and the hand tool 27.

(8) The user can design a process by selecting and combining an API, a task sample program, a sample program, etc. that are provided in the process planning and designing controller 215, i.e., an API used to execute tasks that the work equipment 23 connected to the RIT-side controller 21 can execute, a task sample program for executing tasks that can be executed by using the jig 25 and/or the hand tool 27 disposed on the workbench 22, and a sample program that is created in advance as an operation of the robot 1.

(9) The saved packaged information is stored in the RIT-side controller 21 or the process planning and designing controller 215 of each RIT 2, and is also saved and shared in the production management system 3 as the contents of tasks that that RIT 2 can execute.

(10) The packaged information is accumulated in each RIT 2 and the production management system 3 so that a process up to completion of a task can be created in each RIT 2, and thus construction of a production system and designing of a work process are completed.

(11) When changing the layout of the work equipment 23, the jig 25, and the hand tool 27 to be disposed or changing the work procedure, the user can reconstruct a work process by partially revising the packaged information or through combination and thus can efficiently construct a production system.

(12) When adding or changing a piece of work equipment 23 to be connected to the RIT 2, the user can beforehand install, in the RIT-side controller 21, a communication application corresponding to the equipment type of the piece of work equipment 23 to be added or changed. Thus, the user can add or change the piece of equipment without re-creating or installing a communication application and thereby efficiently construct a production system. The communication application for each equipment type and the packaged information can be downloaded from the production management system 3, and when the RIT-side controller 21 does not have the communication application corresponding to the piece of work equipment 23 to be added or changed or the packaged information, the RIT-side controller 21 downloads the communication application or the packaged information from the production management system 3.

(Execution of Tasks)

The RIT 2 makes the robot 1 and the work equipment 23 execute tasks by the following procedure (13) through (26):

(13) Upon receiving a task execution command from the production management system 3, the robot 1 moves to a front side of the RIT 2 that is installed to execute tasks.

(14) The robot 1 moves to the front side of the target RIT 2 while performing self-localization by the function of the self-propelled cart 13 of the robot 1. If the robot 1 does not have a travel function, the robot 1 may be moved to the front side of the target RIT 2 by hand.

(15) When the robot 1 has moved to the front side of the RIT 2, the robot 1 connects its RIT connection interface and the robot I/F 213 of the RIT 2 to each other. The robot I/F 213 uses a communication standard that meets minimum requirements for issuing operation commands to the robot 1 and the hand tool 27, receiving the status of the robot, etc.

(16) The method for connecting the robot-side controller 14 of the robot 1 and the RIT-side controller 21 of the RIT 2 to each other is not limited to wire-line connection and may instead be wireless radio-wave connection or optical connection as long as required communication accuracy can be secured.

(17) When the power source 40 and/or the air supply source 41 are/is disposed in the RIT 2, the robot 1 may connect the power source connecting part 131 and/or the air supply source connecting part 132 to the power source 40 and/or the air supply source 41, and may supply electricity and/or air and/or charge the battery at the same time.

(18) The robot-side controller 14 of the robot 1 takes an image of the position recognition marker 28 disposed on the RIT 2 by the camera 111 of the robot 1, calculates an amount of positional difference between the robot 1 and the RIT 2, and matches the coordinate system of the robot 1 with that of the RIT 2.

(19) When the RIT 2 and the robot 1 are connected to each other, the RIT-side controller 21 of the RIT 2 acquires a work process plan by communicating with the production management system 3. Information to be acquired includes an operation information package to be used, a work process flow, and the number of times that the work process is to be repeated. When a process plan is not acquired from the production management system 3, the RIT-side controller 21 may use a process plan that is pre-set by the user.

(20) The RIT-side controller 21 of the RIT 2 acquires status information on the robot 1 and the work equipment 23 and information on the jig 25 and the hand tool 27 disposed on the RIT 2, and determines whether or not the process plan can be executed. When the process plan cannot be executed, the RIT-side controller 21 notifies the user that the process plan cannot be executed through the process planning and designing controller 215 serving as the HM I/F disposed on the RIT 2 or through the HM I/F 32 of the production management system 3.

(21) The RIT-side controller 21 of the RIT 2 sends operation commands to the work equipment 23 and the robot 1 that order them to operate in conjunction with each other. The operation commands need not be sent once in each sampling cycle, and instead packaged operation commands may be sequentially sent according to the progress status of the process.

(22) When the robot 1 and the work equipment 23 start to perform a task in which they operate in conjunction with each other, the RIT-side controller 21 of the RIT 2 monitors the progress status of the process plan and sends the progress status to the production management system 3 at appropriate timings. The production management system 3 integrates progress statuses sent from the RITs 2 and monitors the progress status of an overall process plan.

(23) The robot 1 and the work equipment 23, while performing the task, monitor their own status (operation status) and send status signals to the RIT-side controller 21 of the RIT 2. If the RIT-side controller 21 of the RIT 2 receives status signals that indicate abnormal states from the robot 1 and the work equipment 23, the RIT-side controller 21 sends countermeasure commands corresponding to the respective abnormal states.

(24) For abnormal states, the degree of emergency may be set according to the state and a plurality of countermeasure patterns may be prepared. For example, for an abnormal state with a high degree of emergency, emergency stop processing of interrupting the process plan including the operation of the work equipment 23 may be performed, while for an abnormal state with a low degree of emergency, a countermeasure pattern may be prepared such as one in which stop processing of the robot 1 and that of the work equipment 23 are sequentially performed after completion of a series of process plans.

(25) When execution of the process plan is completed, the RIT-side controller 21 of the RIT 2 sends an end processing command to the robot 1 and the work equipment 23 and sends a task completion signal to the production management system 3.

(26) After sending the task completion signal, the RIT-side controller 21 of the RIT 2 enters a standby state to receive a next-process execution command for the robot 1 from the production management system 3.

(Next-Process Execution Command)

The RIT 2 issues a next-process execution command to the robot 1 by the following procedure (27) through (29):

(27) Upon receiving a task completion signal, the production management system 3 generates a next-process execution command for the robot 1 based on progress information from the other RITs 2, and sends the command to the RIT-side controller 21 of the RIT 2.

(28) The RIT-side controller 21 of the RIT 2 sends the received next-process execution command to the robot-side controller 14 of the robot 1. The next-process execution command includes position information on a next-process RIT 2, and a moving path and an arrival time of the robot 1, or the like.

(29) Upon receiving the next-process execution command, the robot 1 starts to move toward the next-process RIT 2.

(Example of Configuration of Inspection System Using RIT 2)

Figure 4:
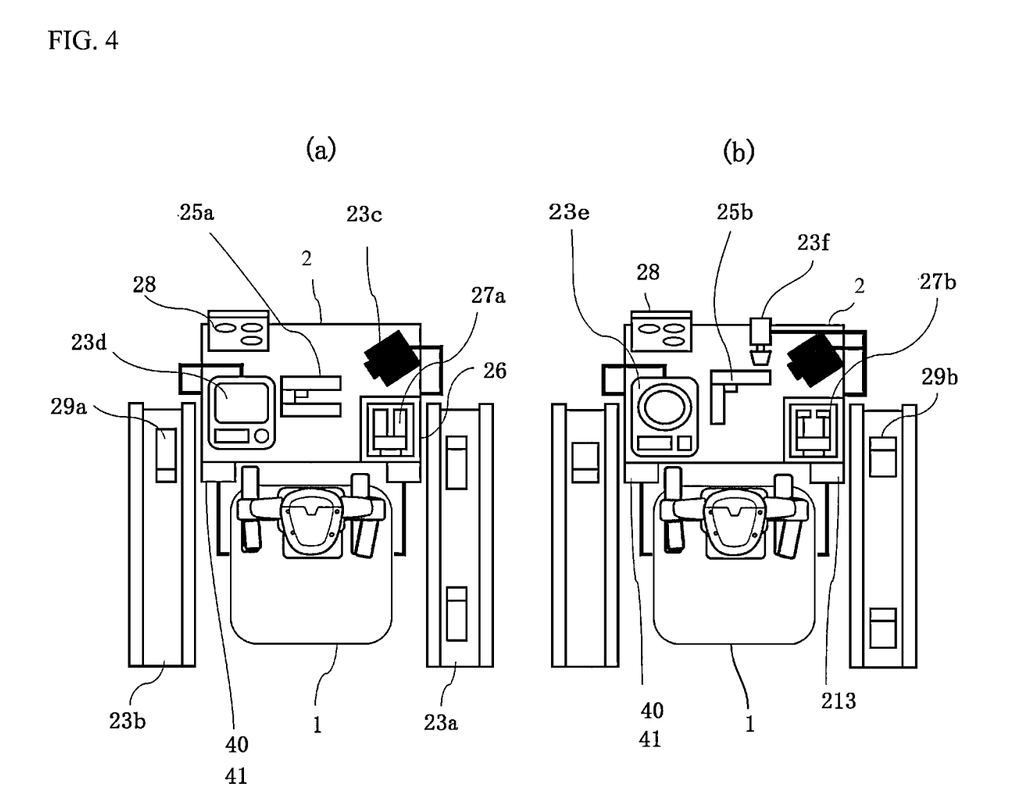
FIG. 4(a) and FIG. 4(b) are plan views respectively showing states before and after replacement of an inspection unit in an inspection system as a production system of one embodiment of the present invention.

FIG. 4(*a*) shows an example of construction of an inspection system using the robots 1 as an example of construction of a production system using the RIT 2. This inspection system performs visual inspection and weight inspection on inspection objects, and (30) through (35) below show an example of implementation of a teaching task by the RIT 2:

(30) A product-being-inspected feeding belt conveyor 23*a*, a product-being-inspected discharging belt conveyor 23*b*, a visual inspection unit 23*c*, and a weighing unit 23*d* for product-being-inspected A are disposed on the RIT 2 as the work equipment 23, and each of these pieces of work equipment 23 is connected to the RIT-side controller 21 (not shown) through the work equipment I/F 211 (not shown). The jig placement region 24 and the tool hanger 26 on the RIT 2 are provided with recognition means (not shown) for identifying an inspection jig 25*a* for product-being-inspected A and a hand tool 27*a* for product-being-inspected A disposed therein and thereon.

(31) The RIT-side controller 21 can control the operation of the product-being-inspected feeding belt conveyor 23*a* and the product-being-inspected discharging belt conveyor 23*b* through the work equipment I/F 211, and can also send an imaging execution command to the visual inspection unit 23*c* and receive image data from the visual inspection unit 23*c*, and can further send an initialization command to the weighing unit 23*d* for product-being-inspected A and receive a measurement result from the weighing unit 23*d*.

(32) Through the workbench-top tool I/F 212 (not shown), the RIT-side controller 21 can receive identification information on the inspection jig 25*a* for product-being-inspected A and the hand tool 27*a* for product-being-inspected A being disposed that is acquired by the recognition means disposed in the jig placement region 24 and on the tool hanger 26.

(33) A user who builds work processes on the process planning and designing controller 215 (not shown) of the RIT 2 is provided with APIs for operating functions that can be respectively executed by the product-being-inspected feeding belt conveyor 23*a*, the product-being-inspected discharging belt conveyor 23*b*, the visual inspection unit 23*c*, and the weighing unit 23*d* for product-being-inspected A, and is also presented with a sample program of tasks that the robot 1 can execute by using the inspection jig 25*a* for product-being-inspected A and the hand tool 27*a* for product-being-inspected A being disposed. The APIs and the task sample program include an operation process of the robot 1 with reference to a specific coordinate position, and the user can set this coordinate position with reference to the coordinate system of the RIT 2.

(34) The user builds work processes based on the APIs and the task sample program, and groups together work processes for each arbitrary category as a package to complete a work process plan.

(35) The completed work process plan is uploaded onto the RIT-side controller 21 of the RIT 2.

A procedure of an example of the operation of the above inspection system is explained in (36) to (40) below:

(36) The robot 1 connected to the RIT 2 takes an image of the position recognition marker 28 fixed to the RIT 2 by the stereo camera 111 of the robot 1, calculates an amount of positional difference between the robot 1 and the RIT 2, and shares a common coordinate system with the RIT 2. The robot 1 also connects to the power source 40 and the air supply source 41 disposed in the RIT 2 to secure electricity and air required to drive the robot 1 and the hand tool 27, and starts to charge the battery 133 (not shown).

(37) The hand tool 27*a* for product-being-inspected A is attached to the robot 1. When a product-being-inspected A 29*a* is fed by the product-being-inspected feeding belt conveyor 23*a* controlled by the RIT-side controller 21, the robot 1 grasps the product-being-inspected A 29*a* using the hand tool 27*a* for product-being-inspected A.

(38) The robot 1 fixes the product-being-inspected A 29*a* to the inspection jig 25*a* for product-being-inspected A that matches the shape of the product-being-inspected A 29*a*. When the product-being-inspected A 29*a* is fixed to the inspection jig 25*a* for product-being-inspected A, the RIT-side controller 21 orders the visual inspection unit 23*c* through the work equipment I/F 211 to execute imaging and transfer image data thereto, and receives the image data of the product-being-inspected A 29*a* from the visual inspection unit 23*c*.

(39) The RIT-side controller 21 sends an initialization command to the weighing unit 23*d* for product-being-inspected A through the work equipment I/F 211 to reset a measured value on the weighing unit 23*d* for product-being-inspected A. When the measured value on the weighing unit 23*d* for product-being-inspected A is reset, the robot 1 grasps again the product-being-inspected A 29*a*, which has undergone the visual inspection, with the hand tool 27*a* for product-being-inspected A, and places the product-being-inspected A 29*a* on the weighing unit 23*d* for product-being-inspected A. When the product-being-inspected A 29*a* is placed on the weighing unit 23*d* for product-being-inspected A, the RIT-side controller 21 sends a command to the weighing unit 23*d* for product-being-inspected A through the work equipment I/F 211 that orders the weighing unit 23*d* for product-being-inspected A to send the result of weight measurement of the product-being-inspected A 29*a* thereto, and receives the measurement result from the weighing unit 23*d* for product-being-inspected A.

(40) When the RIT-side controller 21 determines that the results of the visual inspection and the weight measurement inspection are acceptable based on a comparison between given criteria, and the received image data and weight measurement result, the robot 1 places the product-being-inspected A 29*a* that has passed the inspection (inspected and accepted product) onto the product-being-inspected discharging belt conveyor 23*b*. When the product-being-inspected A 29*a* is placed on the product-being-inspected discharging belt conveyor 23*b*, the RIT-side controller 21 controls the operation of the product-being-inspected discharging belt conveyor 23*b* so as to deliver the product-being-inspected A 29*a* to a next process.

A procedure of an example of implementation of reconstruction of an inspection system is explained in (41) to (44) below:

(41) As shown in FIG. 4(*b*), when changing the weighing unit 23*d* for product-being-inspected A to a weighing unit 23*e* for product-being-inspected B, the user installs a communication application for the weighing unit 23*e* for product-being-inspected B in the RIT-side controller 21. In the case that the communication application for the weighing unit 23*e* for product-being-inspected B is already installed or a weighing unit communication application installed in the RIT-side controller 21 is applicable also to communication with the weighing unit 23*e* for product-being-inspected B, an API for operating the weighing unit 23*e* for product-being-inspected B is automatically provided to the process planning and designing controller 215 when the weighing unit 23*e* for product-being-inspected B is connected to the RIT-side controller 21.

(42) When changing the inspection object from the product-being-inspected A 29*a* to a product-being-inspected B 29*b*, the user also changes the inspection jig 25*a* for product-being-inspected A and the hand tool 27*a* for product-being-inspected A to an inspection jig 25*b* for product-being-inspected B and a hand tool 27*b* for product-being-inspected B that correspond to the product-being-inspected B. When the RIT-side controller 21 recognizes through the workbench-top tool I/F 212 that the jig 25 and the hand tool 27 have been changed to those corresponding to the product-being-inspected B 29*b*, the process planning and designing controller 215 is provided with a sample program of tasks that the robot 1 can execute on the product-being-inspected B 29*b*.

(43) When arranging an additional piece of inspection equipment 23*f* for inspecting the product-being-inspected B 29*b*, the user installs a communication application for the additional piece of inspection equipment 23*f* in the RIT-side controller 21. In the case that the communication application corresponding to the additional piece of inspection equipment 23*f* is already installed in the RIT-side controller 21, an API for operating the additional piece of inspection equipment is automatically provided to the process planning and designing controller 215 when the additional piece of inspection equipment 23*f* is connected to the RIT 2.

(44) When changing the layout of the pieces of inspection equipment, the user re-sets the coordinate positions in the APIs and the task sample program to arbitrary positions in the created work process package and can thereby change the reference positions for the respective operations.

The robot task integration table 2 and the production system using this table 2 of the above embodiment make it possible to easily configure and reconfigure a system by simply combining the robot 1 and the work equipment 23 etc. and thus easily construct a production system using a robot. Moreover, it is possible to reduce the man-hours taken for integration of a production system associated with arrangement, connection, etc. of work equipment to a work table that cause an increase in the introduction cost.

Further, the pieces of work equipment 23 are classified into several equipment types and the RIT-side controller 21 is installed with the communication applications corresponding to the respective equipment types. Thus, when there is a corresponding communication application, arranging a different piece of work equipment 23 does not cause preparation of a communication environment again, which can reduce the man-hours taken for integration of a production system.

In addition, the standard for the communication between the robot 1 and the RIT 2 can be simplified by assigning control of the work equipment 23 and process management to the RIT-side controller 21. For example, if robot operation patterns are packaged and uploaded onto the robot-side controller 14 and process management is performed by ladder control or the like, simple communication between devices such as digital input and output suffices as communication between the RIT-side controller 21 and the robot-side controller 14 during execution of a process.

Figure 5:
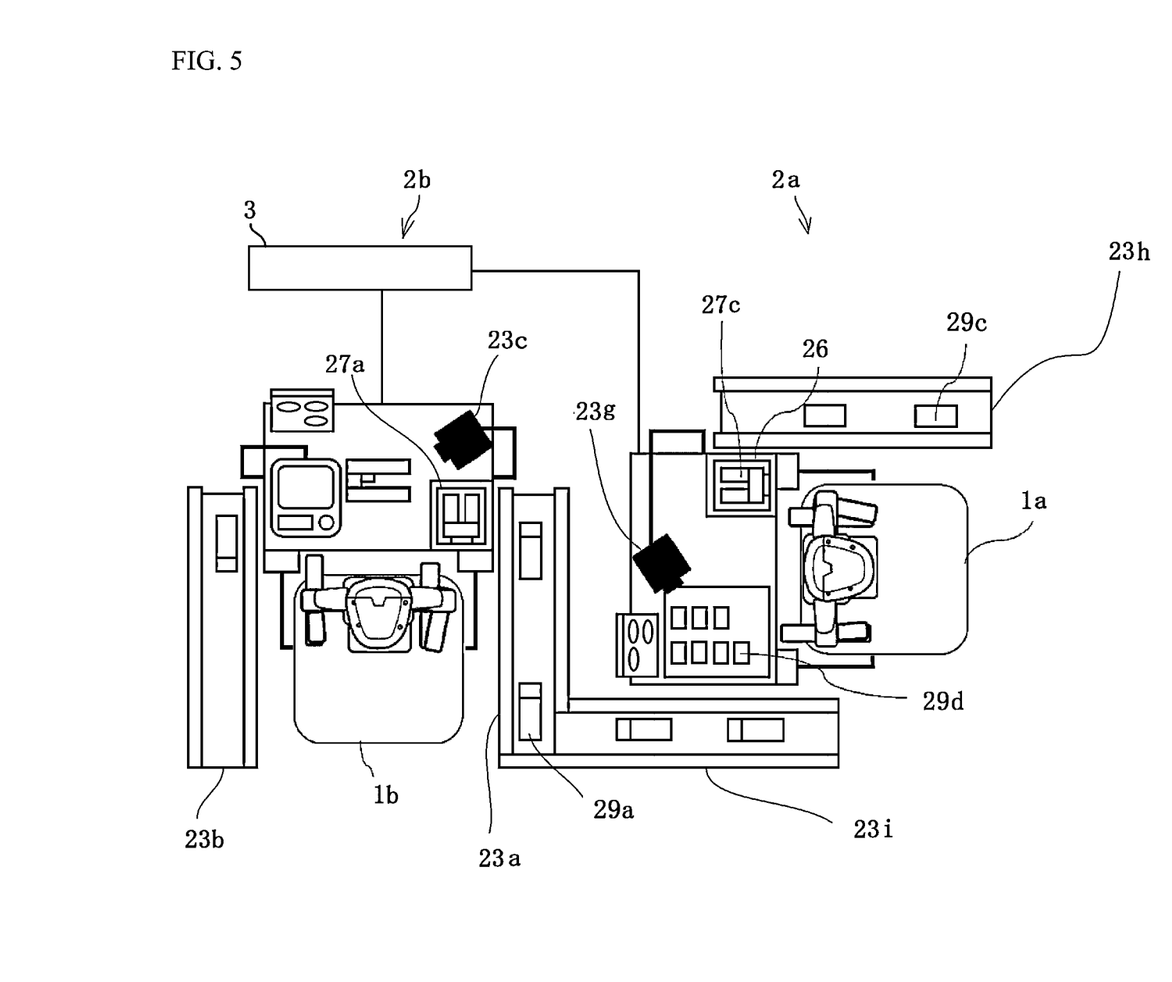
FIG. 5 is a plan view showing an assembly and inspection system as a production system of another embodiment of the present invention.

A procedure of an example of implementation of construction of a production system combining a plurality of RITs is explained in (45) to (48) below:

(45) FIG. 5 is a plan view showing an assembly and inspection system as a production system of another embodiment according to the present invention. In this assembly and inspection system, the first-process robot 1*a* and the first-process RIT 2*a* on the right side of the drawing combine the first part 29*c* of the product-being-inspected A and the second part 29*d* of the product-being-inspected A into the product-being-inspected A 29*a*, and sends the product-being-inspected A 29*a* to the second-process robot 1*b* and the second-process RIT 2*b* on the left side of the drawing by a conveyor. The second-process robot 1*b* and the second-process RIT 2*b* inspect the product-being-inspected A 29*a* in the same manner as in the above embodiment and distinguish between non-defective products and defective products.

(46) A first-part-of-product-being-inspected-A feeding belt conveyor 23*h* that feeds the first part 29*c* of the product-being-inspected A, a product-being-inspected-A discharging belt conveyor 23*i* that discharges the assembled product-being-inspected A 29*a*, and a position recognition unit 23*g* that recognizes the first part 29*c* of the product-being-inspected A and the second part 29*d* of the product-being-inspected A are disposed on the first-process RIT 2*a* as work equipment, and each of these pieces of work equipment is connected to the RIT-side controller 21. A hand tool 27*c* for the first part of the product-being-inspected A is disposed on the tool hanger 26 placed on the first-process RIT 2*a*. The product-being-inspected-A discharging belt conveyor 23*i* that is controlled by the first-process RIT 2*a* and the product-being-inspected feeding belt conveyor 23*a* that is controlled by the second-process RIT 2*b* are coupled to each other, so that the product-being-inspected A 29*a* can be passed between these RITs. The first-process RIT 2*a* and the second-process RIT 2*b* are each connected to the production management system 3.

(47) Belt conveyors of which the operation can be controlled by the same communication application as the belt conveyor used in the second-process RIT 2*b* are disposed as the first-part-of-product-being-inspected-A feeding belt conveyor 23*h* and the product-being-inspected-A discharging belt conveyor 23*i*. An imaging device to which an imaging execution command can be sent and from which image data can be received by the same communication application as the visual inspection unit 23*c* used in the second-process RIT 2*b* is disposed as the position recognition unit 23*g*. The hand tool 27*a* for the product-being-inspected A serves also as the hand tool 27*c* for the first part of the product-being-inspected A.

(48) When a communication application corresponding to the work equipment being disposed or hand tool information is not installed in the RIT-side controller 21, the first-process RIT 2*a* downloads the required communication application from the production management system 3.

When a production system is thus configured, APIs for operating the pieces of work equipment are automatically provided to the process planning and designing controller even in a case that a new production system with different contents of tasks is configured, and simply combining the robot 1, the work equipment 23, etc. can configure a system, so that a production system using a robot can be easily constructed. Moreover, it is possible to reduce the man-hours taken for integration of a production system associated with arrangement, connection, etc. of work equipment to a work table that causes an increase in the introduction cost.

While the present invention has been described above based on the shown embodiments, the invention is not limited to the above embodiments but can be appropriately changed as needed within the scope of the description of the claims. For example, the multi-function integrated work table of the invention may include a function that enables a collaborative operation by a human and a robot. Specifically, the multi-function integrated work table may have a laser sensor or a light curtain disposed thereon to detect workers approaching a periphery of the multi-function integrated work table, and may cause the robot to perform deceleration processing, stop processing, or the like for a collaborative operation. In this way, a collaborative operation can be enabled even when the robot does not have a detection function for a collaborative operation, and the absence of safety fences means greater flexibility in the arrangement layout of the multi-function integrated work table.

When there is a worker in an arrangement region of the multi-function integrated work table that is a destination of movement of the robot, the multi-function integrated work table may send a command to the robot through the production management system that prohibits the robot from entering that region or orders the robot to decelerate, and may warn the worker of the approaching robot. Thus, the safety of the production system can be enhanced compared with when a moving robot is operated independently.

Further, in the present invention, a production system may be constructed in which a plurality of robots is disposed near the multi-function integrated work table and these robots operate in a coordinated manner as well as operate in conjunction with work equipment.

INDUSTRIAL APPLICABILITY

The multi-function integrated work table and the production system using this work table of the present invention can execute a work process in which a robot near the work table and working equipment on the work table and/or near the work table operate in conjunction with each other, as well as allow a user to easily plan and design this work process, and can thereby simplify the procedure of construction and reconstruction of a production system associated with arrangement, addition, replacement, change in arrangement, etc. of work equipment. It is therefore possible to easily construct a production system using a robot and thereby more efficiently develop and introduce a production system using a robot.

REFERENCE SIGNS LIST

1 Multi-skilled humanoid robot (robot)
1a First-process robot
1b Second-process robot
10 Articulated arm
101 Tool changer
102 Electricity supply mechanism
103 Air supply mechanism
11 Head
111 Stereo camera (camera)
12 Neck
13 Self-propelled cart
131 Power source connecting part
132 Air supply source connecting part
133 Battery
14 Robot-side controller
15 Robot body
2 Robot task integration table (RIT)
2a First-process RIT
2b Second-process RIT
21 RIT-side controller
201 Preceding-process RIT
202 Succeeding-process RIT
211 Work equipment interface (I/F)
212 Workbench-top tool interface (I/F)
213 Robot interface (I/F)
214 Production management system interface (I/F)
215 Process planning and designing controller
22 Workbench
23 Work equipment
23a Product-being-inspected feeding belt conveyor
23b Product-being-inspected discharging belt conveyor
23c Visual inspection unit
23d Weighing unit for product-being-inspected A
23e Weighing unit for product-being-inspected B
23f Additional piece of inspection equipment
23g Position recognition unit
23h First-part-of-product-being-inspected-A feeding belt conveyor
23i Product-being-inspected discharging belt conveyor
24 Jig placement region
25 Jig
25a Inspection jig for product-being-inspected A
25b Inspection jig for product-being-inspected B
26 Tool hanger
27 Hand tool
27a Hand tool for product-being-inspected A
27b Hand tool for product-being-inspected B
27c Hand tool for first part of product-being-inspected A
28 Position recognition marker
29a Product-being-inspected A
29b Product-being-inspected B
29c First part of product-being-inspected A
29d Second part of product-being-inspected A
3 Production management system
31 Production integration management unit
32 Human-machine interface (HM I/F)
311 RIT communication unit
40 Power source
41 Air supply source
23A Work equipment A
23B Work equipment B
23C Work equipment C
50 Operator (user)
501 Jig/hand tool identification means
502 Work-equipment-A-type communication application
503 Work-equipment-B-type communication application
504 Work-equipment-C-type communication application
505 Camera communication application
506 Jig/hand tool identification software
507 Robot/work equipment communication and control software
508 Robot communication application
601 Work table
602 Robot controller
603 Work-equipment-A-1 communication application
604 Work-equipment-A-2 communication application
605 Work-equipment-B communication application
606 Work-equipment-C communication application
608 Robot
609 Robot hand tool
610 Process planning and designing controller (user interface)
611 Automated guided vehicle (AGV)

The invention claimed is:

1. A multi-function integrated work table which configures a production system by combining at least one robot that is disposed in a distance from the work table and has a robot-side controller and at least one piece of work equipment that is disposed on the work table or in the distance from the work table and used in a work process performed with the robot, the work table being characterized in that:
 a work table-side controller and a process planning and designing controller that is capable of being operated by a user are provided in a state of being communicably connected to each other;
 the work table-side controller has work equipment communication and connection means that is compatible with one or more communication standards and capable of communicating with the work equipment, and robot communication and connection means that is capable of communicating with the robot-side controller;
 the work table-side controller receives signals carrying identification and state monitoring information on:
  the robot from the robot-side controller; and
  the work equipment from the work equipment;
 after receiving the signals, the work table-side controller sends the identification and the state monitoring information to the process planning and designing controller, and by further sending operation command signals to the robot-side controller and the work equipment in accordance with the work process in which the robot and the work equipment operate in conjunction with each other, and then receives operation status signals from the robot-side controller and the work equipment;
 based on the signals carrying the identification and the state monitoring information on the robot and the work equipment, the process planning and designing controller plans and designs the work process in which the robot and the work equipment operate in conjunction with each other;
 the pieces of work equipment are classified by equipment type;
 the work table-side controller has a work equipment communication and connection program corresponding to at least one equipment type; and
 when the at least one piece of work equipment includes pieces of work equipment which are connected to the work table-side controller and are of a same equipment type, the work equipment communication and connection program is able to communicate with these pieces of work equipment by the same work equipment communication and connection program, contains information on tasks that the pieces of work equipment connected to the work table-side controller are capable of executing, and provides the process planning and designing controller with information on executable tasks and information that aids creation of a program for executing these tasks in addition to identification information on the pieces of work equipment connected to the work table-side controller.

2. The multi-function integrated work table according to claim 1, wherein:
 a jig placement region in which a jig used in a work process using the robot is placed or a tool hanger that holds a hand tool used in a work process using the robot is disposed on the work table;
 the jig or the hand tool is provided with a data tag containing identification information on the jig or the hand tool;
 the work table further has, in the jig placement region or on the tool hanger, jig or hand tool identification means for identifying the jig or the hand tool on the work table by recognizing the data tag of the jig or the hand tool; and
 the work table-side controller is connected to the jig or hand tool identification means to acquire identification information on the jig or the hand tool from the jig or hand tool identification means.

3. The multi-function integrated work table according to claim 2, wherein at least one of the data tags of the jig or the hand tool is a two-dimensional bar code or an IC chip.

4. The multi-function integrated work table according to claim 2, wherein:
 the work table-side controller has a jig or hand tool recognition program; and
 the jig or hand tool recognition program contains information on tasks that the robot is capable of executing using a jig or a hand tool disposed on the work table, and presents the process planning and designing controller with information on executable tasks and information on a sample operation for executing these tasks in addition to identification information on the jig or the hand tool disposed on the work table.

5. The multi-function integrated work table according to claim 1, wherein:
 a jig placement region in which a jig used in a work process using the robot is placed or a tool hanger that holds a hand tool used in a work process using the robot is disposed on the work table;
 the jig or the hand tool is provided with a data tag containing identification information on the jig or the hand tool; and
 the work table further has, in the jig placement region or on the tool hanger, jig or hand tool identification means for identifying the jig or the hand tool on the work table by recognizing the data tag of the jig or the hand tool.

6. The multi-function integrated work table according to claim 5, wherein:
 the work table-side controller has a jig or hand tool recognition program; and
 the jig or hand tool recognition program contains information on tasks that the robot is capable of executing using a jig or a hand tool disposed on the work table, and presents the process planning and designing controller with information on executable tasks and information on a sample operation for executing these tasks in addition to identification information on the jig or the hand tool disposed on the work table.

7. The multi-function integrated work table according to claim 5, wherein:
 at least one of the data tags of the jig or the hand tool is a two-dimensional bar code or an IC chip;
 the work table-side controller has a jig or hand tool recognition program; and
 the jig or hand tool recognition program contains information on tasks that the robot is capable of executing using a jig or a hand tool disposed on the work table, and presents the process planning and designing controller with information on executable tasks and information on a sample operation for executing these tasks in addition to identification information on the jig or the hand tool disposed on the work table.

8. A production system comprising:
 a multi-function integrated work table which configures the production system by combining at least one robot that is disposed in a distance from the work table and has a robot-side controller and at least one piece of work equipment that is disposed on the work table or in the distance from the work table and used in a work process performed with the robot, the work table being characterized in that:

a work table-side controller and a process planning and designing controller that is capable of being operated by a user are provided in a state of being communicably connected to each other;

the work table-side controller has work equipment communication and connection means that is compatible with one or more communication standards and capable of communicating with the work equipment, and robot communication and connection means that is capable of communicating with the robot-side controller;

the work table-side controller receives signals carrying identification and state monitoring information on:
the robot from the robot-side controller; and
the work equipment from the work equipment;

after receiving the signals, the work table-side controller sends the identification and the state monitoring information to the process planning and designing controller, and by further sending operation command signals to the robot-side controller and the work equipment in accordance with the work process in which the robot and the work equipment operate in conjunction with each other, and then receives operation status signals from the robot-side controller and the work equipment;

based on the signals carrying the identification and the state monitoring information on the robot and the work equipment, the process planning and designing controller plans and designs the work process in which the robot and the work equipment operate in conjunction with each other;

the at least one piece of work equipment is connected to the work table-side controller based on at least one communication standard;

the work table-side controller executes the work process in which the robot and the work equipment used in the work process operate in conjunction with each other;

the pieces of work equipment are classified by equipment type;

the work table-side controller has a work equipment communication and connection program corresponding to at least one equipment type; and when the at least one piece of work equipment includes pieces of work equipment which are connected to the work table-side controller and are of a same equipment type, the work equipment communication and connection program is able to communicate with these pieces of work equipment by the same work equipment communication and connection program, contains information on tasks that the pieces of work equipment connected to the work table-side controller are capable of executing, and provides the process planning and designing controller with information on executable tasks and information that aids creation of a program for executing these tasks in addition to identification information on the pieces of work equipment connected to the work table-side controller.

9. The production system according to claim 8, wherein:
the robot has a plurality of articulated arms, a head, a neck that is capable of changing a posture of the head, and a self-propelled cart that is capable of moving the robot to an arbitrary position and in an arbitrary direction;
the robot-side controller controls operation of the articulated arm, the head, the neck, and the self-propelled cart;
one of the articulated arms has a tool changer to which different hand tools are attachable, and a mechanism that supplies electricity or air required for operation of the hand tool;
the head has a stereo camera, and an imaging direction of the stereo camera is changeable through operation of the neck;
the work table has a power source or an air supply source; and
the self-propelled cart has a connecting part that is separably connected to the work table, and when the connecting part is connected to the work table, electricity or air supplied from the power source or the air supply source of the work table through the connecting part is supplied to the robot, and also a battery mounted on the self-propelled cart is charged with electricity supplied from the electricity supply source of the work table through the connecting part.

10. The production system according to claim 9, wherein:
the work table has a position recognition marker thereon for the robot to recognize a relative positional relationship between the work table and the robot; and
when the connecting part of the self-propelled cart is connected to the work table, the robot takes an image of the position recognition marker by the stereo camera and shares a common coordinate system with the work table.

11. The production system according to claim 10, wherein:
the process planning and designing controller is included in the work table and compiles, as robot operation information, at least one of a robot operation pattern for the robot to use the work equipment and a control pattern of a hand tool attached to the robot, and compiles an operation pattern of the work equipment as work equipment operation information, and constructs a production system by combining the robot operation information and the work equipment operation information;
the robot operation information of robot and the work equipment operation information are input into and retained by the work table-side controller; and
operation of the robot and operation of the work equipment are controlled by the work table-side controller.

12. The production system according to claim 10, wherein:
the process planning and designing controller is included in the robot, and compiles, as robot operation information, at least one of a robot operation pattern for the robot to use the work equipment and a control pattern of a hand tool attached to the robot, or compiles an operation pattern of the work equipment as work equipment operation information, and constructs a production system by combining the robot operation information and the work equipment operation information;
the compiled robot operation information is input into and retained by the robot-side controller;
the compiled work equipment operation information is input into and retained by the work table-side controller;
operation of the robot is controlled by the robot-side controller; and
operation of the work equipment is controlled by the work table-side controller.

13. The production system according to claim 9, wherein:
the process planning and designing controller is included in the work table, and compiles, as robot operation information, at least one of a robot operation pattern for the robot to use the work equipment and a control pattern of a hand tool attached to the robot, and compiles an operation pattern of the work equipment as work equipment operation information, and constructs a production system by combining the robot operation information and the work equipment operation information.

14. The production system according to claim 13, wherein:
   the process planning and designing controller is included in the work table;
   the robot operation information and the work equipment operation information are input into and retained by the work table-side controller; and
   operation of the robot and operation of the work equipment are controlled by the work table-side controller.

15. The production system according to claim 9, wherein:
   the process planning and designing controller is included in the robot;
   compiled robot operation information is input into and retained by the robot-side controller;
   compiled work equipment operation information is input into and retained by the work table-side controller;
   operation of the robot is controlled by the robot-side controller; and
   operation of the work equipment is controlled by the work table-side controller.

16. The production system according to claim 8, wherein:
   the process planning and designing controller is included in the work table, and compiles, as robot operation information, at least one of a robot operation pattern for the robot to use the work equipment and a control pattern of a hand tool attached to the robot, and compiles an operation pattern of the work equipment as work equipment operation information, and constructs a production system by combining the robot operation information and the work equipment operation information.

17. The production system according to claim 16, wherein:
   the process planning and designing controller is included in the work table;
   the robot operation information and the work equipment operation information are input into and retained by the work table-side controller; and
   operation of the robot and operation of the work equipment are controlled by the work table-side controller.

18. The production system according to claim 8, wherein:
   the process planning and designing controller is included in the robot;
   compiled robot operation information is input into and retained by the robot-side controller;
   compiled work equipment operation information is input into and retained by the work table-side controller;
   operation of the robot is controlled by the robot-side controller; and
   operation of the work equipment is controlled by the work table-side controller.

19. The production system according to claim 8, wherein:
   the production system includes a production management system that has a process management controller and manages an overall process including a work progress status of at least a process preceding or a process succeeding a current work process; and
   the work table-side controller communicates with the process management controller.

\* \* \* \* \*